(12) United States Patent
Akutsu et al.

(10) Patent No.: US 10,644,642 B2
(45) Date of Patent: May 5, 2020

(54) THREE PHASE DUPLEXING MOTOR FOR ELECTRIC POWER STEERING APPARATUS

(71) Applicant: Mitsubishi Electric Corporation, Tokyo (JP)

(72) Inventors: Satoru Akutsu, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/069,915

(22) PCT Filed: Mar. 14, 2016

(86) PCT No.: PCT/JP2016/057964
§ 371 (c)(1),
(2) Date: Jul. 13, 2018

(87) PCT Pub. No.: WO2017/158680
PCT Pub. Date: Sep. 21, 2017

(65) Prior Publication Data
US 2019/0028053 A1    Jan. 24, 2019

(51) Int. Cl.
*H02P 29/032* (2016.01)
*H02P 29/66* (2016.01)
(Continued)

(52) U.S. Cl.
CPC .......... *H02P 29/662* (2016.11); *B62D 5/0475* (2013.01); *B62D 5/0484* (2013.01);
(Continued)

(58) Field of Classification Search
CPC ........ H02P 25/22; H02P 29/032; H02P 27/06; H02P 21/22; H02P 29/024; H02P 29/025;
(Continued)

(56) References Cited

U.S. PATENT DOCUMENTS 8,878,474 B2 * 11/2014 Kezobo ................ B62D 5/0487
318/400.21
9,787,240 B2 * 10/2017 Koseki ................ B62D 5/0484
(Continued)

FOREIGN PATENT DOCUMENTS

DE      102015212585 A1    1/2016
EP        3210849 A1    8/2017
(Continued)

OTHER PUBLICATIONS

Communication dated Nov. 6, 2018 issued by the Japanese Patent Office in counterpart application No. 2018-5050690.
(Continued)

*Primary Examiner* — Thai T Dinh
(74) *Attorney, Agent, or Firm* — Sughrue Mion, PLLC; Richard C. Turner

(57) ABSTRACT

To provide a three phase duplexing motor for electric power steering apparatus that can manage increase in a supply current and can manage influence on motor, when increasing a supply current to the three phase windings of the normal set. An three phase duplexing motor for electric power steering apparatus sets 0 to a supply current to three phase winding of abnormality occurrence set, and increases a supply current to three phase windings of the normal set, with a preliminarily set increase upper limit current value as an upper limit.

11 Claims, 13 Drawing Sheets

(51) Int. Cl.
*B62D 5/04* (2006.01)
*H02P 25/22* (2006.01)

(52) U.S. Cl.
CPC ............ *B62D 5/0496* (2013.01); *H02P 25/22* (2013.01); *H02P 29/032* (2016.02)

(58) Field of Classification Search
CPC ........ H02P 29/60; H02P 25/022; H02P 29/66; B62D 5/0487; B62D 5/0481; B62D 5/0457; B62D 5/0496; B62D 5/0475
See application file for complete search history.

(56) References Cited

U.S. PATENT DOCUMENTS

| | | | | |
|---|---|---|---|---|
| 10,411,574 | B2* | 9/2019 | Nakashima | ............ H02K 11/33 |
| 10,486,736 | B2* | 11/2019 | Uryu | ........................ H02P 25/22 |
| 2005/0189828 | A1 | 9/2005 | Nakayama et al. | |
| 2011/0074323 | A1 | 3/2011 | Mukai | |
| 2011/0156627 | A1* | 6/2011 | Nakamura | ........... B62D 5/0403 318/400.22 |
| 2011/0156629 | A1* | 6/2011 | Satou | ................... B62D 5/0484 318/453 |
| 2011/0204839 | A1* | 8/2011 | Mukai | .................. B62D 5/0403 318/724 |
| 2013/0200827 | A1* | 8/2013 | Kezobo | ............... B62D 5/0487 318/400.21 |
| 2016/0006387 | A1 | 1/2016 | Nakamura et al. | |
| 2016/0329853 | A1 | 11/2016 | Koseki et al. | |
| 2017/0166248 | A1 | 6/2017 | Asao et al. | |

FOREIGN PATENT DOCUMENTS

| | | | | |
|---|---|---|---|---|
| EP | 3210849 | A4 * | 6/2018 | .......... B62D 5/0484 |
| JP | 2006-223037 | A | 8/2006 | |
| JP | 2011-078221 | A | 4/2011 | |
| JP | 2013-038950 | A | 2/2013 | |
| JP | 2015-104235 | A | 6/2015 | |
| WO | 2004/010562 | A1 | 1/2004 | |
| WO | 2015/098537 | A1 | 7/2015 | |

OTHER PUBLICATIONS

Extended European Search Report dated Feb. 26, 2019 in Patent Application No. 16894304.1.
International Search Report for PCT/JP2016/057964, dated May 31, 2016.

* cited by examiner

FIG. 9
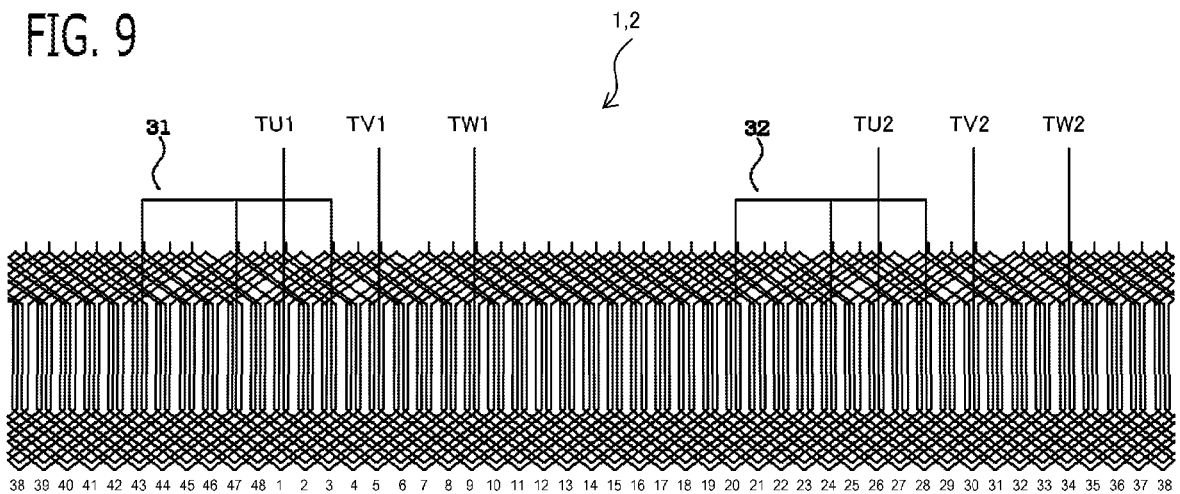
FIG. 10
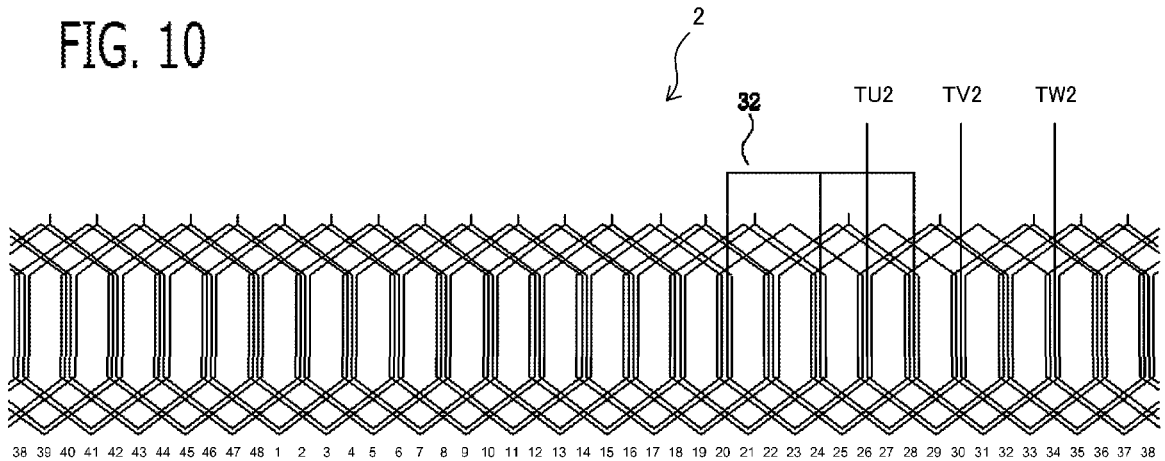
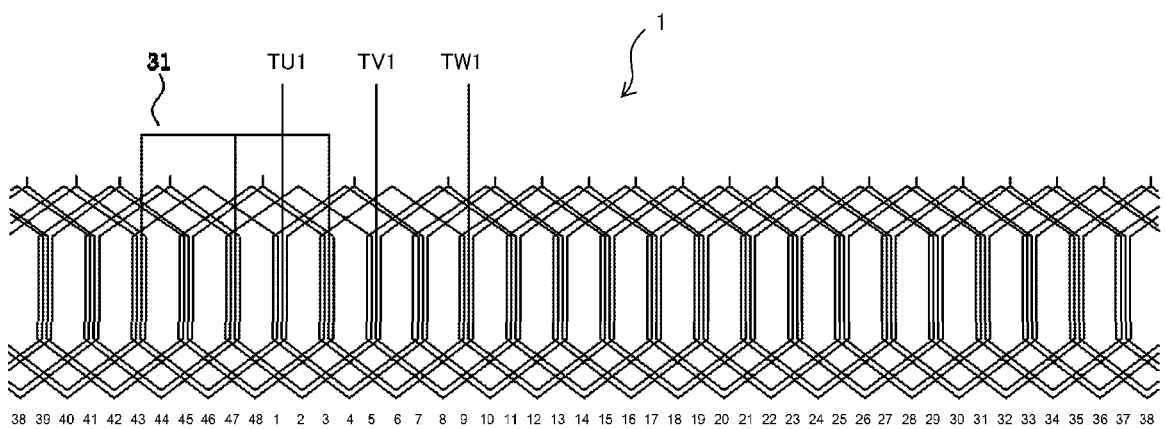

FIG. 11
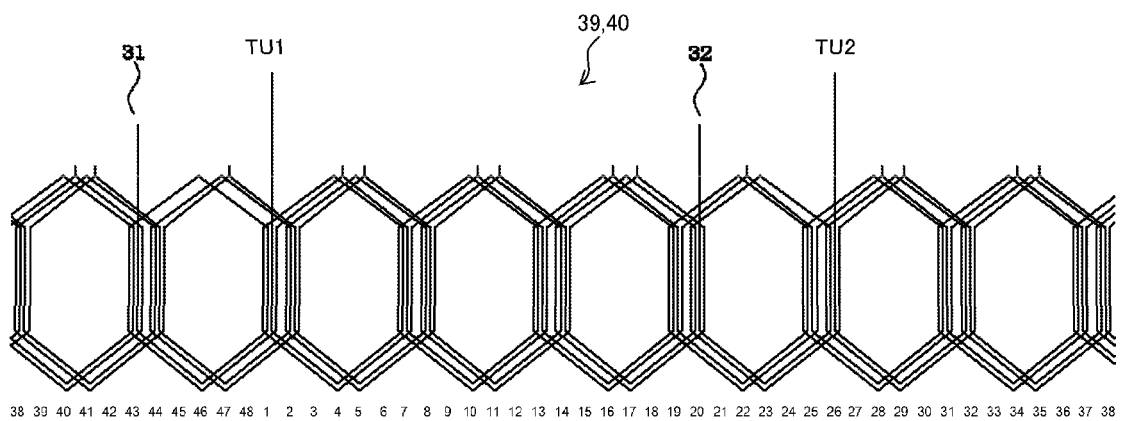
FIG. 12
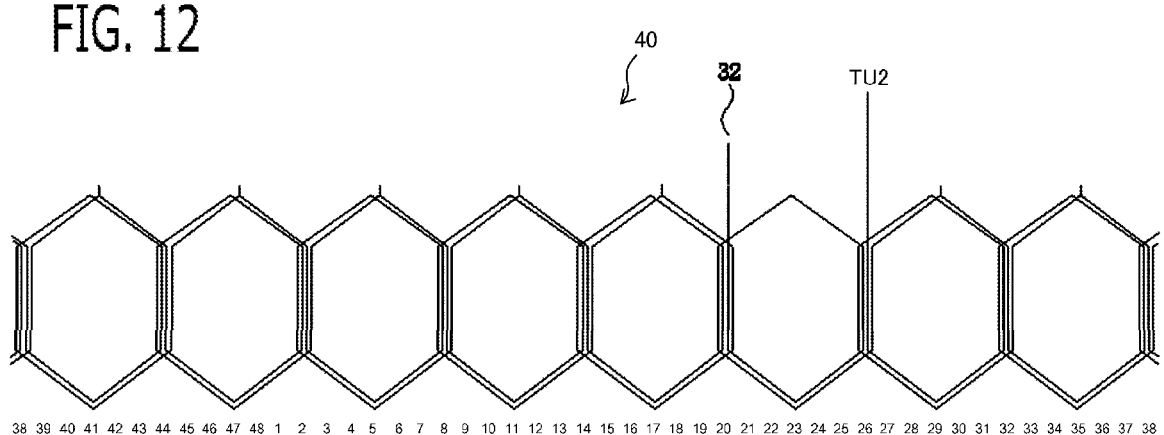
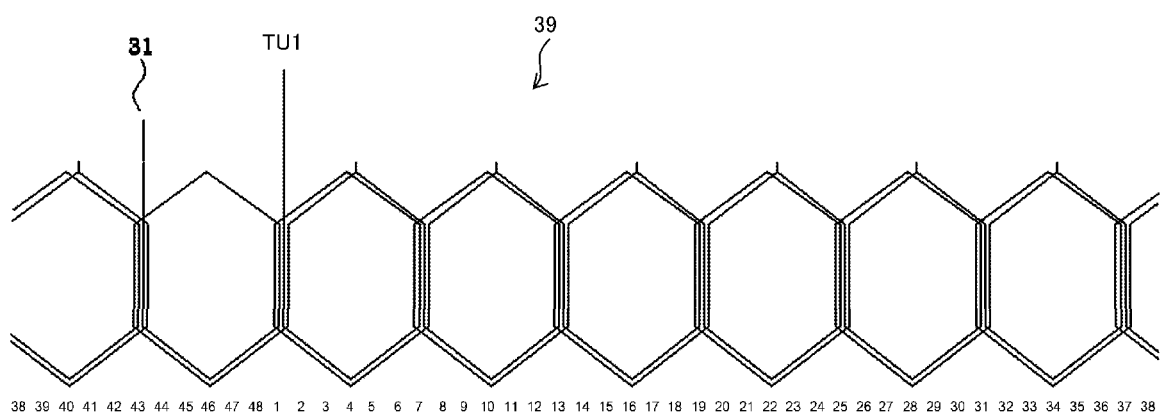

FIG. 14
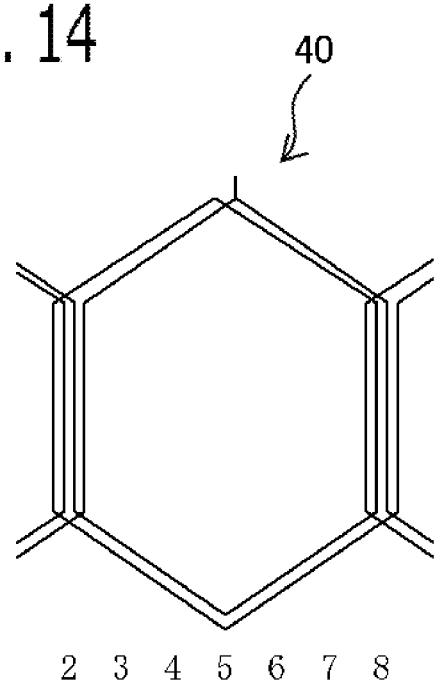
2 3 4 5 6 7 8
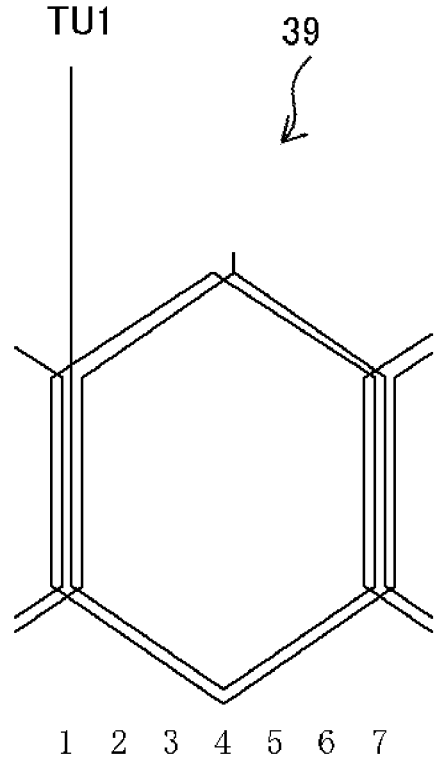
1 2 3 4 5 6 7

THREE PHASE DUPLEXING MOTOR FOR ELECTRIC POWER STEERING APPARATUS

CROSS REFERENCE TO RELATED APPLICATIONS

This Application is a National Stage of International Application No. PCT/JP2016/057964 filed Mar. 14, 2016.

TECHNICAL FIELD

The present disclosure relates to a three phase duplexing motor for an electric power steering apparatus.

BACKGROUND ART

With regard to the above three phase duplexing motor, the technology described in PLT 1 is already known. When abnormality occurs in the switching device of the predetermined phase of one set, in torque which the windings of abnormality occurrence set generates, torque reduction causes at the predetermined electrical angle corresponding to the abnormal phase. In the technology of PLT 1, in order to compensate the torque reduction of the abnormality occurrence set, a torque which the normal set of the windings generates is increased at the predetermined electrical angle at which the torque reduction causes.

CITATION LIST

Patent Literature

PLT 1: JP 2011-78221 A (paragraph 0047 to 0049)

SUMMARY OF INVENTION

Technical Problem

By the way, if a supply current to the normal set of the windings is increased from the normal time, there is a possibility that an endurance of winding is deteriorated by increase in a temperature of the normal set of the windings, and the permanent magnet is demagnetized by increase in an magnetic field which acts in the direction which demagnetizes the permanent magnet of the rotor. Especially when the supply current to windings of all phases of abnormality occurrence set is set to 0, it is necessary to increase supply power to the normal set of windings significantly in order to compensate torque reduction, and a possibility of the temperature increase of winding and the magnetic demagnetization become large. However, in the technology of PLT 1, a technology to these problems of temperature increase and magnetic demagnetization is not disclosed.

Then, it is desirable to provide a three phase duplexing motor for electric power steering apparatus that can manage influence on the motor such as the temperature increase of winding and the magnetic demagnetization by the increase in the supply current, when increasing the supply current to the three phase windings of the normal set more than the normal time at the time of abnormality occurrence of one set.

Solution to Problem

A three phase duplexing motor for an electric power steering apparatus according to the present disclosure including:

a motor which is provided with a stator equipped with 2 sets of three phase windings, and a rotor equipped with a permanent magnet, and drives a steering mechanism of a vehicle;

2 sets of inverters which supply AC power to each set of the three phase windings; and a controller which controls the 2 sets of inverters, wherein when abnormality occurs in a control system of the three phase windings of one set, the controller sets 0 to a supply current to the three phase windings of an abnormality occurrence set, and increases a supply current to the three phase windings of a normal set more than normal time, with a preliminarily set increase upper limit current value as an upper limit.

Advantage of Invention

According to a three phase duplexing motor for electric power steering apparatus of the present disclosure, torque reduction of the motor by setting 0 to the supply current to the three phase windings of the abnormality occurrence set can be compensated by increasing the supply current to the three phase windings of the normal set more than the normal time. At this time, since the increase in the supply current of the normal set is upper-limited by the preliminarily set increase upper limit current value, the influence on increase in heating amount of winding and demagnetization of permanent magnet by increase in current can be managed within a presupposed range, and within this presupposed range, the cooling performance of the motor, the coercive force of the permanent magnet, and the like can be designed previously.

BRIEF DESCRIPTION OF THE DRAWINGS

FIG. 9 is a winding arrangement and a connection diagram of the three phase duplexing motor according to Embodiment 2;

FIG. 10 is a winding arrangement and a connection diagram of each set of the three phase duplexing motor according to Embodiment 2;

FIG. 11 is a winding arrangement and a connection diagram of U phase of two sets of the three phase duplexing motor according to Embodiment 2;

FIG. 12 is a winding arrangement and a connection diagram of U phase of each set of the three phase duplexing motor according to Embodiment 2;

FIG. 14 is a winding arrangement and a connection diagram of six slot pitches of each set of the three phase duplexing motor according to Embodiment 2;

DETAILED DESCRIPTION OF THE EMBODIMENTS

Embodiment 1

Figure 1:
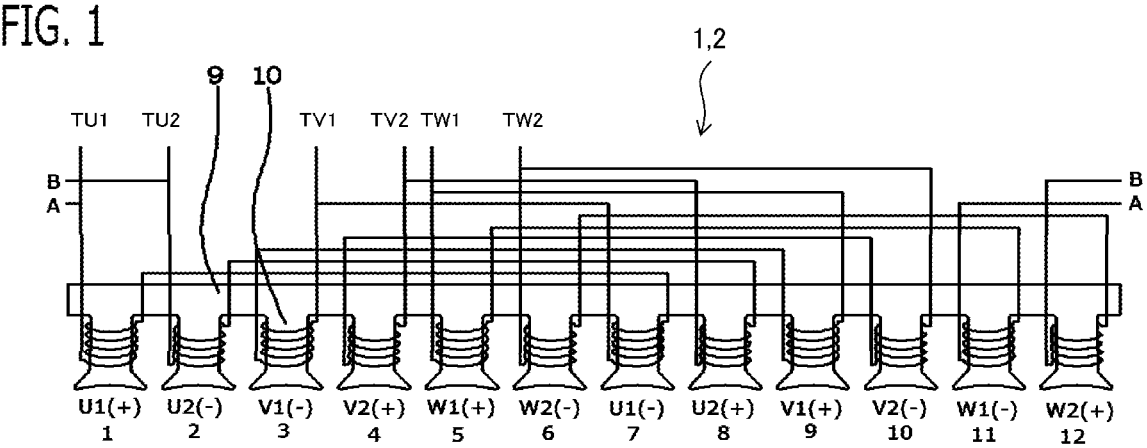
FIG. 1 is a winding arrangement and a connection diagram of the three phase duplexing motor according to Embodiment 1.
Figure 2:
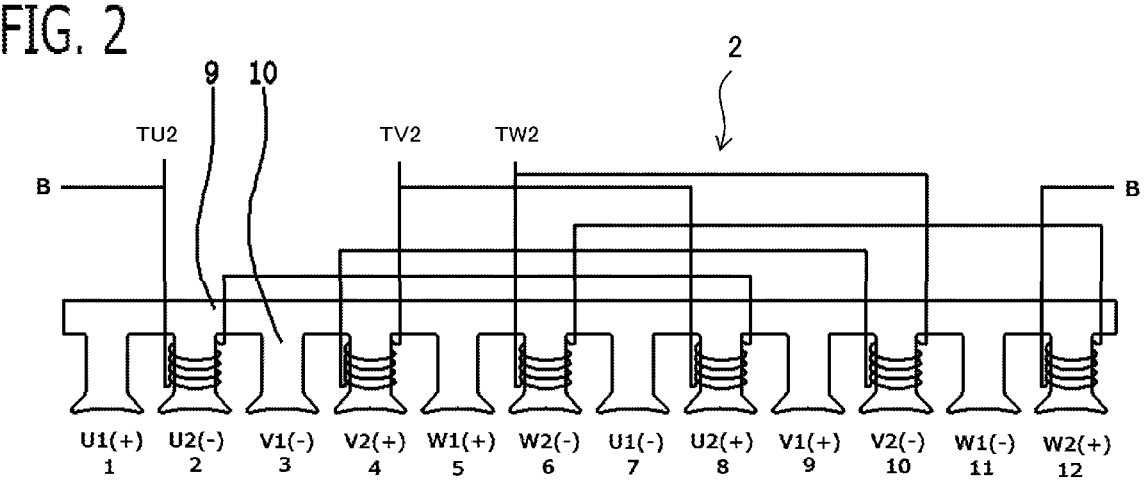
FIG. 2 is a winding arrangement and a connection diagram of each set of the three phase duplexing motor according to Embodiment 1.
Figure 3:
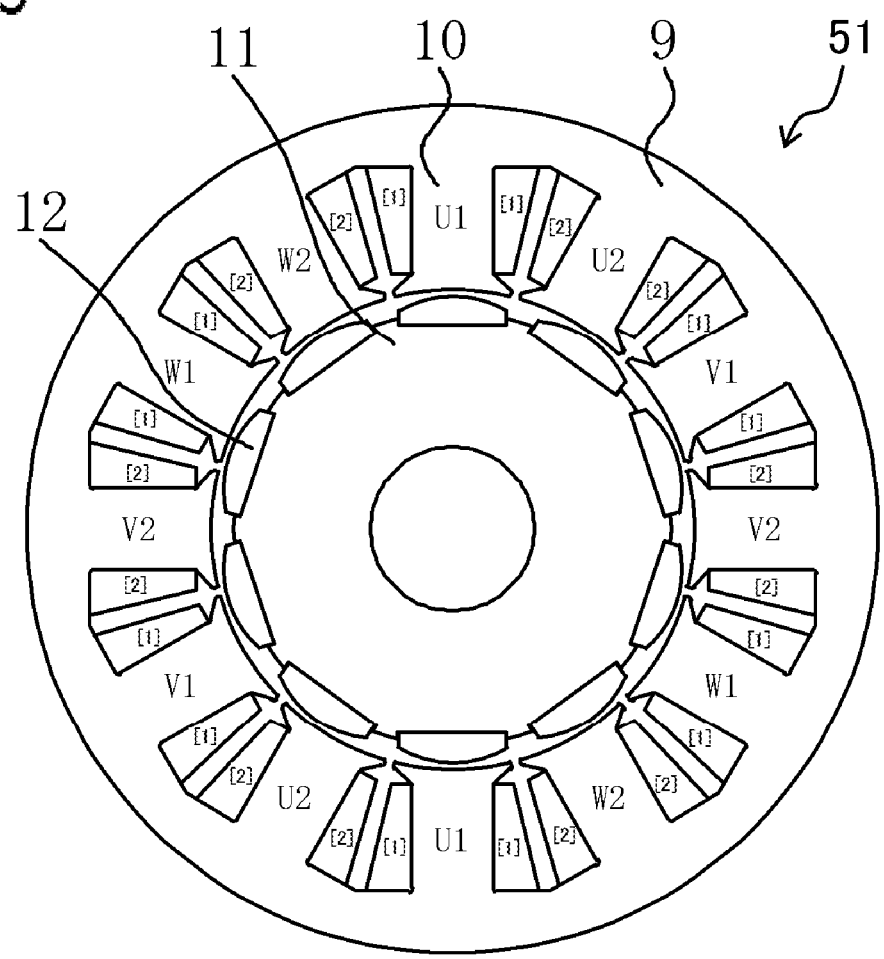
FIG. 3 is a cross-sectional view of a motor according to Embodiment 1.
Figure 4:
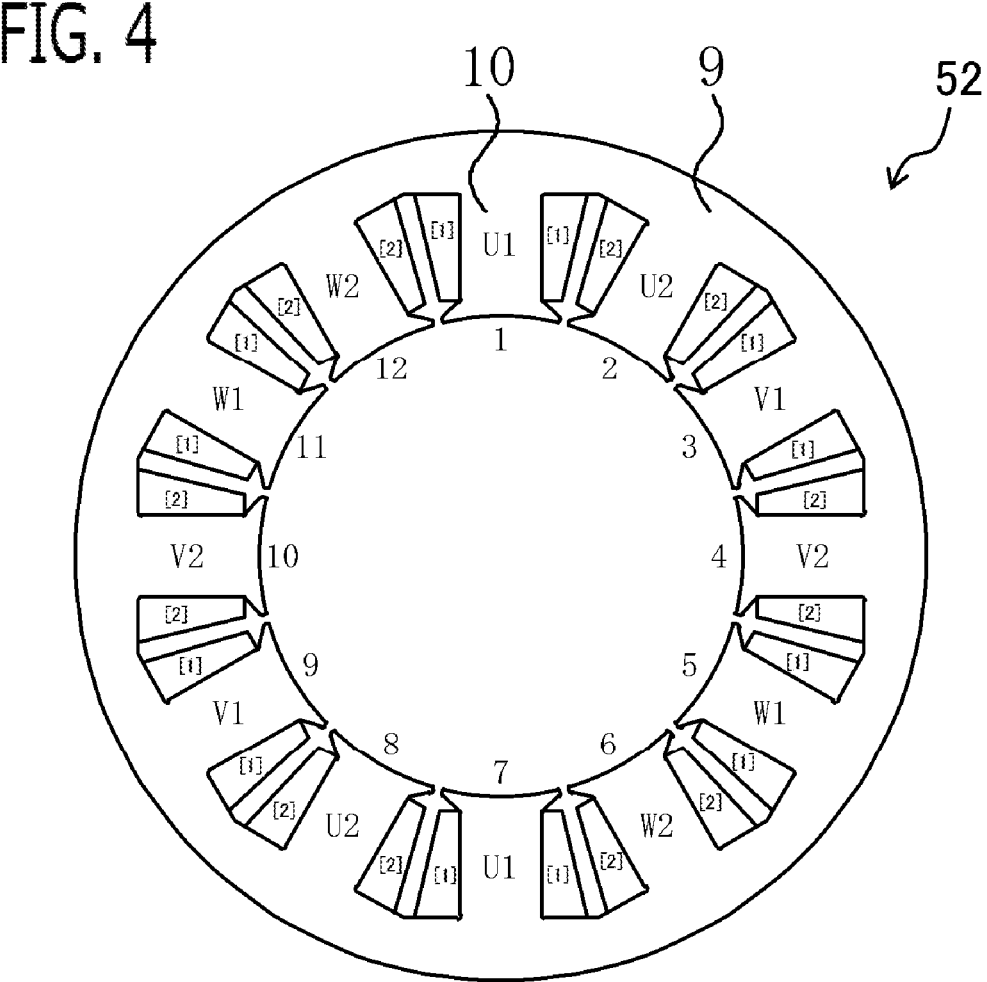
FIG. 4 is a cross-sectional view of a stator according to Embodiment 1.
Figure 5:
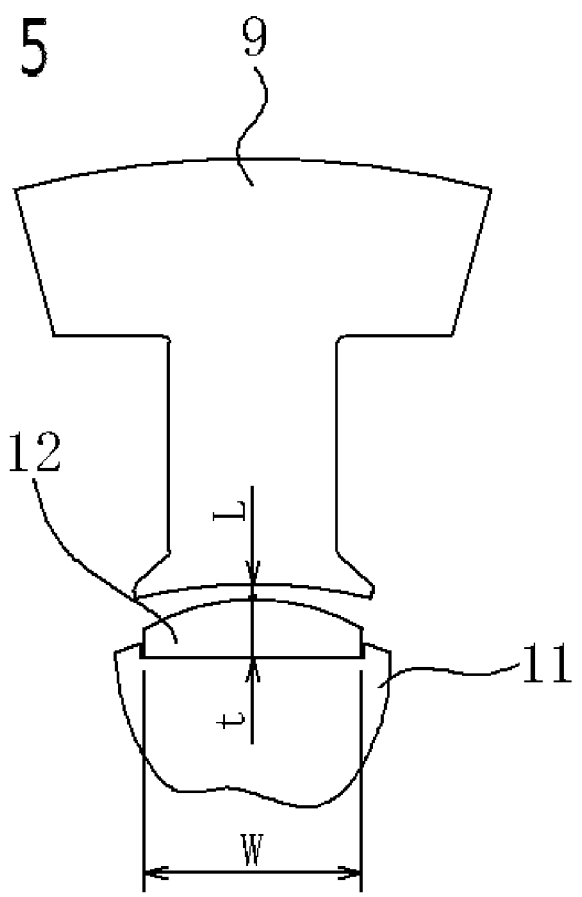
FIG. 5 is a partial cross-sectional view of a motor according to Embodiment 1.
Figure 6:
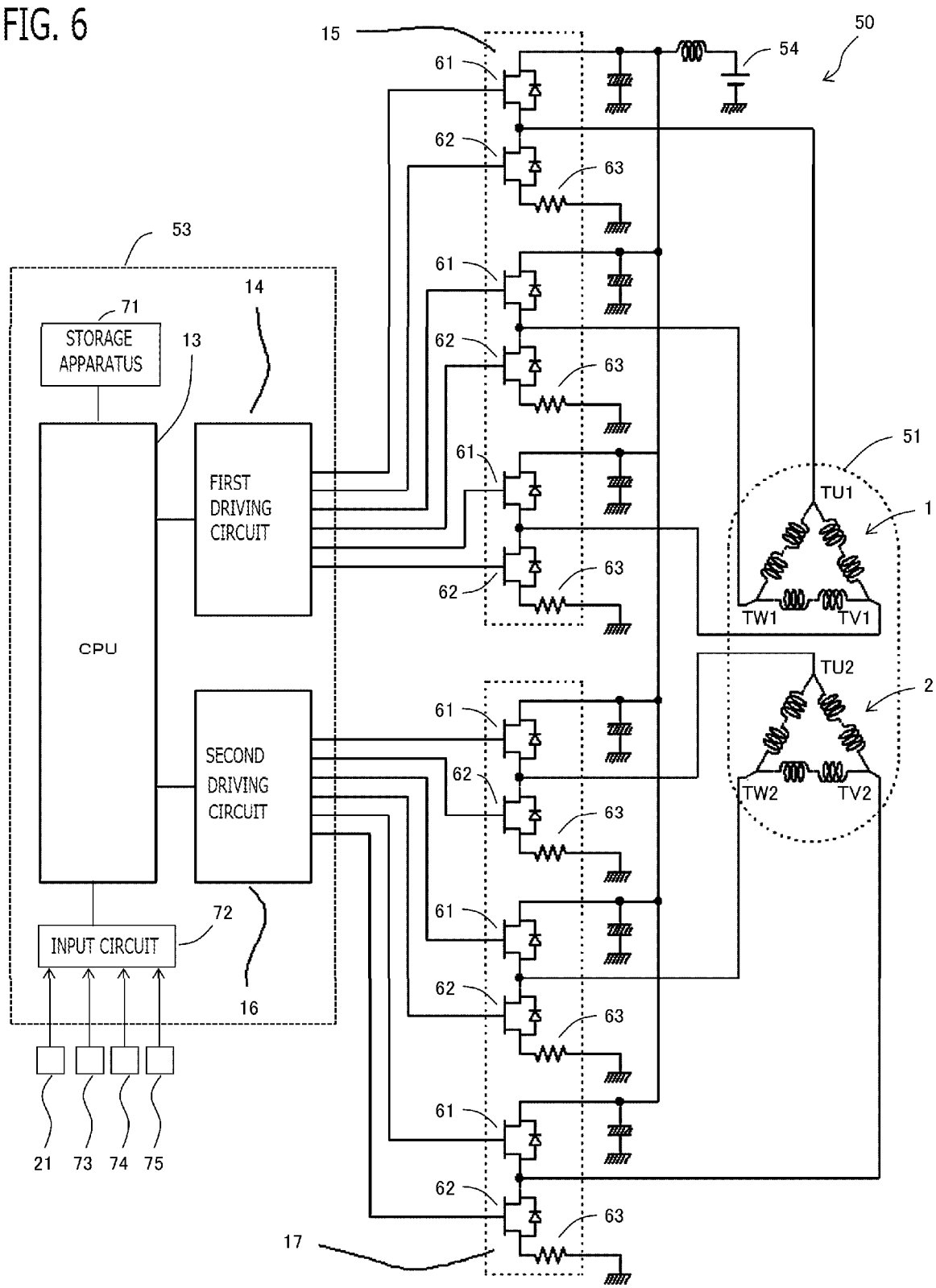
FIG. 6 is a schematic configuration diagram of a three phase duplexing motor according to Embodiment 1.
Figure 7:
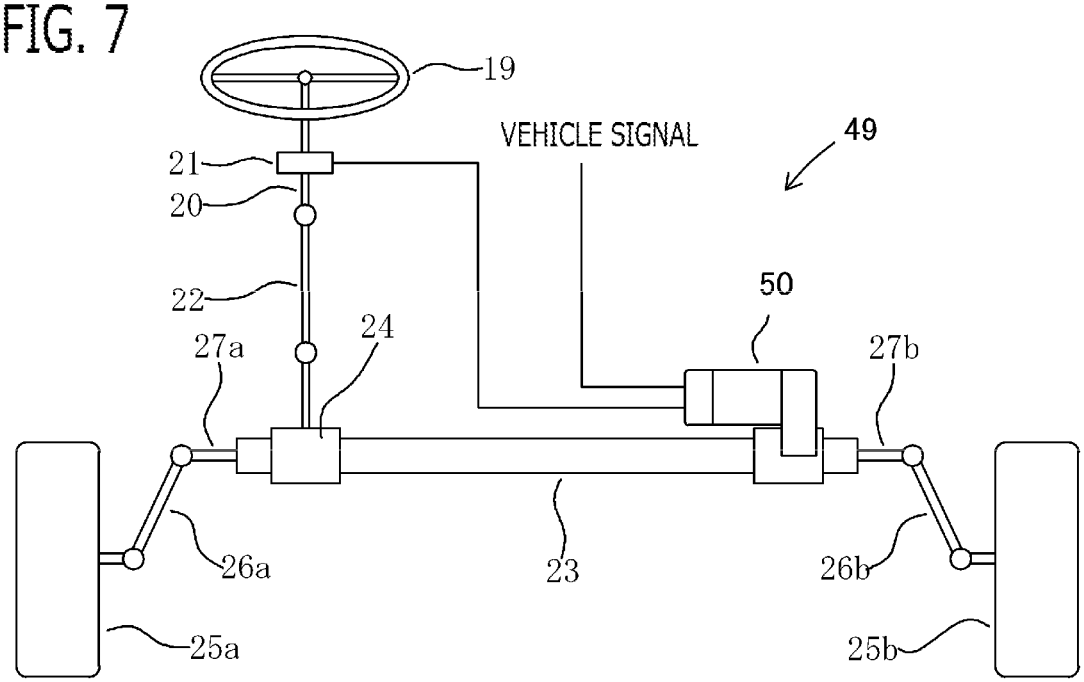
FIG. 7 is a schematic configuration diagram of an electric power steering device according to Embodiment 1.
Figure 8:
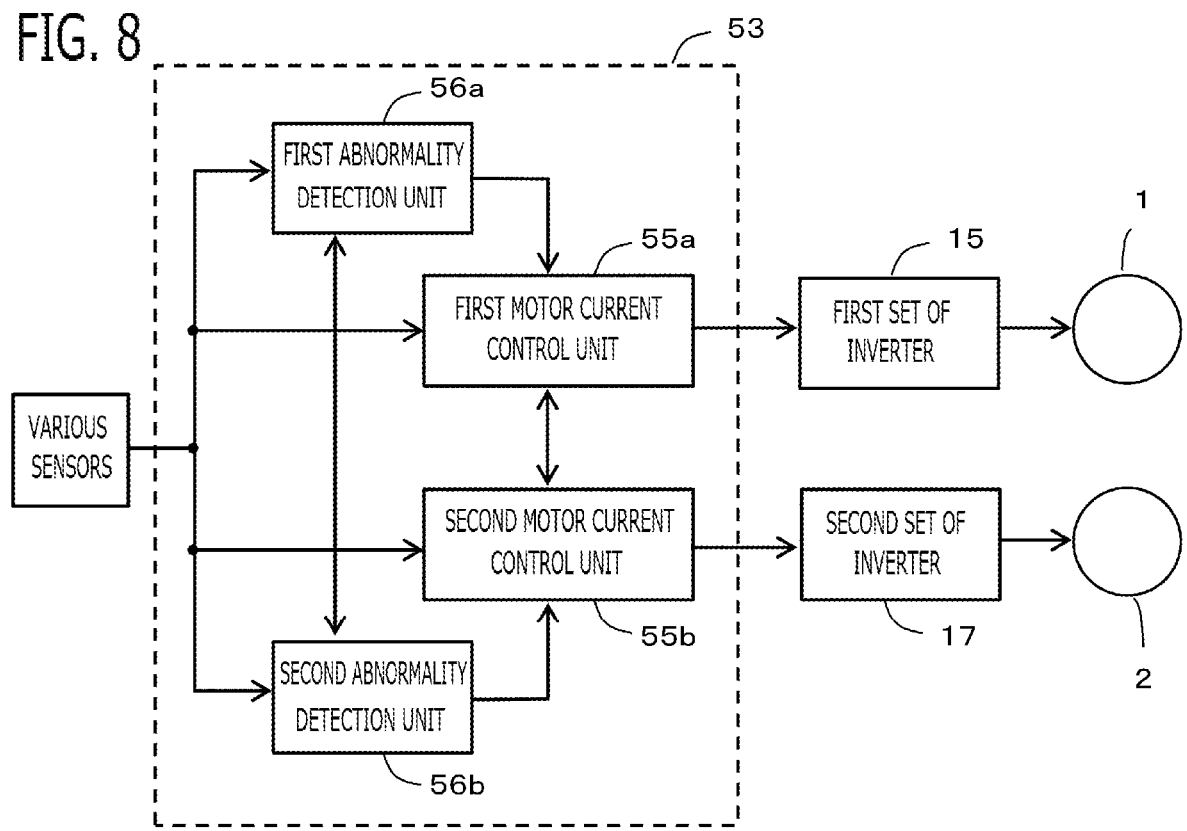
FIG. 8 is a schematic block diagram of a controller according to Embodiment 1.

A three phase duplexing motor 50 for electric power steering apparatus 49 (hereinafter, referred to simply as the three phase duplexing motor 50) according to Embodiment 1 will be explained with reference to drawings. FIG. 1 is a winding arrangement and a connection diagram of the three phase duplexing motor 50 according to the present embodiment; FIG. 2 is a winding arrangement and a connection diagram of each set; FIG. 3 is a cross-sectional view of the motor 51; FIG. 4 is a cross-sectional view of the stator 52; FIG. 5 is a partial cross-sectional view of the motor 51; FIG. 6 is a circuit diagram of the three phase duplexing motor 50; FIG. 7 is a schematic configuration diagram of the electric power steering apparatus 49; and FIG. 8 is a schematic block diagram of the controller 53.

The three phase duplexing motor 50 is provided with a motor 51 which is provided with a stator 52 equipped with 2 sets of three phase windings 1 and 2, and a rotor equipped with a permanent magnet 12; 2 sets of inverters 15 and 17 which supply AC power to each set of the three phase windings 1 and 2; and a controller 53 which controls the 2 sets of inverters 15 and 17. The motor 51 drives a steering mechanism of a vehicle.

As shown in FIG. 7, the three phase duplexing motor 50 is built into the electric power steering apparatus 49. A handle 19 which a driver operates is connected with a steering shaft 20. A torque sensor 21 which detects a steering force of the driver is attached to the steering shaft 20. The steering shaft 20 is connected with a pinion gear 24 in a rack shaft 23 via an intermediate shaft 22. Knuckle arms 26a and 26b of front wheels 25a and 25b which are steering control wheels are connected to tie rods 27a and 27b connected with the rack shaft 23. When a motion of the rack shaft 23 transmits to the front wheels 25a and 25b through the tie rods 27a and 27b and the knuckle arms 26a and 26b, the front wheels 25a and 25b are steered. The rack shaft 23 is connected with the motor 51 via gears, and a rotational driving force of the motor 51 is a driving force for driving the rack shaft 23.

In the electric power steering apparatus 49 constituted in this way, when the driver steers the handle 19, a torque signal according to steering is transmitted to the controller 53 from the torque sensor 21. The controller 53 calculates a required assist torque based on vehicle signals, such as the torque signal and vehicle speed, and controls a supply current to the motor 51 so that the motor 51 outputs the assist torque.

As shown in FIG. 1 and FIG. 2, the first set and second set of the three phase windings 1 and 2 are concentrated winding, and are connected by delta connection, respectively. The first set of three phase windings 1 is provided with three phase connection terminals TU1, TV1, and TW1 connected to the first set of inverter 15. The second set of three phase windings 2 is provided with three phase connection terminals TU2, TV2, and TW2 connected to the second set of inverter 17. The first set of the three phase windings 1 and the second set of the three phase windings 2 are wound around different teeth 10 of the stator 52 with each other, and are not wound around the same teeth 10. The first set of three phase windings 1 and the second set of three phase windings 2 are wound around teeth 10 adjacent to each other in the peripheral direction. The number on the lower side of each of teeth 10 in FIG. 1 and FIG. 2 shows the teeth number.

As shown in FIG. 3, the motor 51 is a configuration of 10 poles 12 slots (teeth). The stator 52 is provided with the stator core 9 formed by laminating electromagnetic steal sheets. The stator core 9 is provided with the 12 teeth 10. 2 sets of the three phase windings 1 and 2 are wound around each tooth 10 sandwiching an insulation material. The rotor 11 is provided inside the stator core 9. The ten permanent magnets 12 are provided at the outer peripheral part of the rotor 11. It may be not surface magnet structure, but embedded magnet structure in which the permanent magnets 12 are embedded inside the rotor 11. [1] in the figure indicates allocation of the first set of windings, and [2] indicates allocation of the second set of windings. Only the stator 52 is shown in FIG. 4. The number described inside the stator core 9 indicates the teeth number. FIG. 5 shows only part of the one tooth 10 and the one permanent magnet 12.

As shown in FIG. 6, the first set of inverter 15 converts DC power supplied from the DC power source 54 (in this example, vehicle battery) into AC power, and supplies to the first set of three phase windings 1. The second set of inverter 17 converts DC power supplied from the DC power source 54 into AC power, and supplies to the second set of three phase windings 2. The first set of inverter 15 is provided with three sets of a series circuit (leg) where a positive electrode side switching device 61 (upper arm) connected to the positive electrode terminal of the DC power source 54 and a negative electrode side switching device 62 (lower arm) connected to the negative electrode terminal of the DC power source 54 are connected in series, corresponding to respective phase of the three phase windings. Accordingly, the first set of inverter 15 is provided with a total of six switching devices 61 and 62 for power conversion. A free-wheel diode is connected in inverse parallel to each switching device. MOSFET (Metal Oxide Semiconductor Field Effect Transistor), IGBT (Insulated Gate Bipolar Transistor), or the like is used for the switching devices 61 and 62.

A connection node of the positive electrode side switching device 61 and the negative electrode side switching device 62 of each phase is connected to the connection terminal TU1, TV1, and TW1 of the corresponding phase in the first set of three phase windings 1, respectively. A shunt resistance 63 for current detection is provided in the series circuit (leg) of each phase, respectively. The both-ends potential difference of the each shunt resistance 63 is inputted into the controller 53, respectively. The switching devices 61 and 62 of the first set of inverter 15 are turned on and off by the control signal outputted from the first driving circuit 14 of the controller 53, respectively.

The second set of inverter 17 is constituted similar to the first set of inverter 15. That is, the second set of inverter 17 is provided with six switching devices 61 and 62 for power conversion, and three shunt resistances 63. A connection node of the positive electrode side switching device 61 and the negative electrode side switching device 62 of each phase is connected to the connection terminal TU2, TV2, and TW2 of the corresponding phase in the second set of three phase windings 2, respectively. The switching devices 61 and 62 of the second set of inverter 17 are turned on and off by the control signal outputted from the second driving circuit 16 of the controller 53, respectively.

As shown in FIG. 8, the controller 53 is provided with a first motor current control unit 55a that controls current supplied to the first set of three phase windings 1 by controlling the first set of inverter 15, a second motor current control unit 55b that controls current supplied to the second set of three phase windings 2 by controlling the second set of inverter 17, a first abnormality detection unit 56a that detects abnormality of the first set of control system, and a second abnormality detection unit 56b that detects abnormality of the second set of control system.

Respective functions of control units 55a, 55b, 56a, 56b, and the like of the controller 53 are realized by processing circuits included in the controller 53. In the present embodiment, as shown in FIG. 6, the controller 53 includes, as processing circuits, a arithmetic processor 13 (computer) such as a CPU (Central Processing Unit), storage apparatuses 71 that exchange data with the arithmetic processor 13, an input circuit 72 that inputs external signals to the arithmetic processor 13, an output circuit that outputs signals from the arithmetic processor 13 to the outside, and the like. As the storage apparatuses 71, there are provided a RAM (Random Access Memory) which can read data and write data from the arithmetic processor 13, a ROM (Read Only Memory) which can read data from the arithmetic processor 13, and the like. The input circuit 72 is connected with various kinds of sensors and switches and is provided with an A/D converter and the like for inputting output signals from the sensors and the switches to the arithmetic processor 13. The output circuit is connected with electric loads such as the first and second driving circuits 14 and 16 which drive on/off of the switching devices, and is provided with a driving circuit and the like for outputting a control signal from the arithmetic processor 13. In the present embodiment, the input circuit 72 is connected with various sensors, such as the shunt resistances 63 as current sensors, the rotation sensor 73 for detecting rotational angle of the rotor 11, the voltage sensor 74 for detecting a power source voltage, the torque sensor 21 for detecting the steering wheel torque of the handle, and the vehicle speed sensor 75 for detecting the travelling speed of the vehicle. The first and second driving circuits 14 and 16 are connected with each switching device 61 and 62.

Then, the arithmetic processor 13 runs software items (programs) stored in the storage apparatus 71 such as a ROM and collaborates with other hardware devices in the controller 53, such as the storage apparatus 71, the input circuit 72, and the output circuit, so that the each function of the control units 55a, 55b, 56a, and 56b provided in the controller 53 are realized.

Each of the first and second motor current control units 55a and 55b calculates the assist torque required to the electric motor 2, based on the vehicle speed and the steering wheel torque detected based on the output signal of the torque sensor 21. Then, each of the first and second motor current control units 55a and 55b calculates a current command of each set of the three phase windings, based on a divided assist torque of each set obtained by multiplying a dividing ratio of each set (50% at normal time) to the assist torque, respectively. Each of the first and second motor current control units 55a and 55b controls on/off of each set of the switching devices 61 and 62 by current feedback control using the vector control method, respectively.

In detail, each of the first and second motor current control units 55a and 55b calculates dq-axis current commands represented in a dq-axis rotating coordinate system, based on each set of the divided assist torque, respectively. In the present embodiment, the dq-axis current commands are calculated, according to the maximum torque current control method that calculates the dq-axis current commands which maximize the generated torque for the same current. The dq-axis rotating system consists of a d-axis defined in the direction of the N pole (magnetic pole position) of the permanent magnet 12 provided in the rotor 11 and a q-axis defined in the direction advanced to d-axis by 90 degrees (Π/2) in an electrical angle, and which is the two-axis rotating coordinate system which rotates synchronizing with rotation of the rotor 11 in the electrical angle.

Each of the first and second motor current control units 55a and 55b calculates the dq-axis voltage commands by proportional-integral control and the like, based on a deviation between current commands and actual currents, in the dq-axis (2 phases) rotating coordinate system; and calculates three phase voltage commands by performing a fixed coordinate conversion and a two-phase/three-phase conversion to the dq-axis voltage commands, respectively. Then, each of the control units performs PWM (Pulse Width Modulation) controls that change a duty ratio of rectangular pulse wave signal which turns on or turns off the switching devices 61 and 62 of each phase by comparing the three phase voltage commands with a carrier, respectively.

There is 30 degrees phase difference in the electrical angle between a supply current supplied to the first set of three phase windings 1, and a supply current supplied to the second set of three phase windings 2. Therefore, between the first set and the second set, it is possible to cancel and reduce the electrical angle 6th order torque ripple which is caused by the 5th and 7th order harmonic waves of the magnetomotive force of the permanent magnet 12, the 5th and 7th order harmonic waves of the magnetomotive force of the stator 52, and the 5th and 7th order harmonic waves of driving current.

Each of the first and second abnormality detection units 56a and 56b detects abnormality of each set of control systems, such as the inverters 15 and 17 and the three phase windings 1 and 2, from sensor information, such as current detecting values, respectively. For example, the abnormality detection unit 56a and 56b detects current which flows when each switching device 61 and 62 is turned on and off by each shunt resistance 63, and determines abnormal part by determining whether or not the current value is normal.

When abnormality is detected, the motor current control unit 55a and 55b of an abnormality occurrence set sets 0 to the supply current to the three phase windings of the abnormality occurrence set. The motor current control unit 55a and 55b of the abnormality occurrence set turns off the all switching devices 61 and 62 of the upper and lower arms of the inverter 15 and 17 of the set in which abnormality occurred.

When abnormality is detected, the motor current control unit 55a and 55b of the normal set increases the supply current to the three phase windings of the normal set more than the normal time, with a preliminarily set increase upper limit current value as an upper limit.

According to this configuration, torque reduction of the motor 51 by setting 0 to the supply current to the three phase windings of the abnormality occurrence set can be compensated by increasing the supply current to the three phase windings of the normal set more than the normal time. At this time, since the increase in the supply current of the normal set is upper-limited by the preliminarily set increase upper limit current value, the influence on increase in heating amount of winding and demagnetization of permanent magnet by increase in current can be managed within a presupposed range; and within this presupposed range, the cooling performance of the motor 51, the coercive force of the permanent magnet, and the like can be designed previously.

The increase upper limit current value is properly set according to design of the vehicle in which the electric power steering apparatus 49 is mounted. When the same torque as the normal time is necessary also for the time of abnormality occurrence, the increase upper limit current value is set to double of the maximum supply current value of each set at the normal time. When a torque of a level causing no problem in a practical use (for example, 70% at the normal time) is necessary for the time of abnormality occurrence, the increase upper limit current value is set to 1.4 times the maximum supply current value of each set at the normal time. In the present embodiment, the increase upper limit current value is set to at least greater than or equal to 1.2 times of the maximum supply current value of each set at the normal time.

When abnormality occurs, the motor current control unit 55a and 55b of the normal set sets a value obtained by multiplying a preliminarily set dividing ratio at the abnormal time (for example, 100% or 70%) to the required current value required for the motor 51, to the current command of the three phase windings of the normal set. Here, a value obtained by multiplying a double value of the dividing ratio at the abnormal time to the maximum supply current value of each set at the normal time corresponds to the increase upper limit current value.

In the present embodiment, when abnormality occurs, the motor current control unit 55a and 55b of the normal set calculates a divided assist torque of the normal set by multiplying the preliminarily set dividing ratio at the abnormal time (for example, 100% or 70%) to the assist torque required for the motor 51 calculated based on the steering wheel torque and the vehicle speed. Then, the motor current control unit 55a and 55b of the normal set calculates the current command of the three phase windings of the normal set based on the divided assist torque of the normal set, as similar to the normal time described above. The motor current control unit 55a and 55b of the normal set outputs the control command which controls on/off of each switching device 61 and 62 of the normal set by performing current feedback control and PWM control, based on the current command of the three phase windings of the normal set, as similar to the normal time described above. In the present embodiment, the motor current control unit 55a and 55b of the normal set performs the maximum torque current control also at the time of abnormality occurrence.

When the supply current of the windings of the normal set is increased, an ampere turn value (current×number of turns) of the normal set of the windings increases and a magnetic field which acts in the direction which demagnetizes the permanent magnet 12 of the rotor 11 increases. When the ampere turn value is increased, in the general design, the permanent magnet 12 is demagnetized and the performance of the motor 51 drops. When the supply current of the windings of the normal set is increased, the heating amount of the windings of the normal set also increases, drive duration time until the temperature of winding reaches allowable temperature becomes short in the general design, and steering is restricted.

In order to avoid this, the increase upper limit current value is set to a rated current value of the three phase windings of each set. That is, the motor 51 is designed to be able to maintain the demagnetizing factor of the permanent magnet 12 less than or equal to an allowable demagnetizing factor, and maintain the temperature of winding continuously less than or equal to allowable temperature even if the supply current of the three phase windings of the normal set is increased to the increase upper limit current value. Therefore, the motor 51 is designed so as to set the increase upper limit current value to the rated current value of the three phase windings of each set.

In the present embodiment, the increase upper limit current value is preliminarily set to a maximum value of a supply current range in which the demagnetizing factor of the permanent magnet 12 becomes less than or equal to a preliminarily set allowable demagnetizing factor and in which the temperature of the three phase windings of each set becomes less than or equal to a preliminarily set allowable temperature at a maximum service temperature of the motor 51. Here, the maximum service temperature is a maximum environmental temperature of the motor 51 allowed on specification.

The allowable demagnetizing factor is a practically allowable demagnetizing factor, for example, is determined to any value less than or equal to 5% (for example, 3%). The demagnetizing factor is an irreversible demagnetizing factor, for example, is a decreasing rate of a flux linkage of the permanent magnet 12 on the basis of the normal time. The allowable temperature is determined to a maximum winding temperature at which an insulation of winding coat can be ensured in an expected lifetime of device (vehicle) with sufficient margin. It is required that the temperature of the three phase windings becomes less than or equal to the allowable temperature continuously.

If there is a margin in the demagnetizing factor, the increase upper limit current value is set to a maximum value of a supply current range in which the temperature of the three phase windings of each set becomes less than or equal to a preliminarily set allowable temperature at the maximum service temperature of the motor 51.

If there is a margin in the temperature of winding, the increase upper limit current value is set to a maximum value of a supply current range in which the demagnetizing factor of the permanent magnet 12 becomes less than or equal to a preliminarily set allowable demagnetizing factor at the maximum service temperature of the motor 51.

In the present embodiment, the increase upper limit current value is set on a basis of an ampere turn value obtained by multiplying a number of turns of winding to current. That is, the increase upper limit current value is set to the increase upper limit ampere turn value, and the motor current control unit 55a and 55b of the normal set increases a supply ampere turn value to the three phase windings of the normal set more than the normal time, with the increase upper limit ampere turn value as an upper limit. By managing by the ampere turn value, it becomes easy to manage the demagnetizing factor of the permanent magnet 12.

There is a case in which the maximum assist torque at the time of abnormality occurrence is designated by the design specification of base performance on the vehicle side, and the dividing ratio at the time of abnormality occurrence and the increase upper limit current value are determined based on this maximum assist torque at the time of abnormality occurrence. In this case, it is necessary to design the cooling mechanism of the permanent magnet 12 and the three phase windings so as to achieve the designated increase upper limit current value.

The permanent magnet 12 is configured (designed) based on a condition in which the supply current to the three phase windings of the normal set was increased to the increase upper limit current value. Specifically, the coercive force of the permanent magnet 12 is configured (designed) so that the demagnetizing factor becomes less than or equal to a preliminarily set allowable demagnetizing factor, when the supply current to the three phase windings of the normal set is increased to the increase upper limit current value at the maximum service temperature of the motor 51. And, a permeance of an operating point of the permanent magnet 12 is configured (designed) so that a demagnetizing factor becomes less than or equal to a preliminarily set allowable demagnetizing factor, when the supply current to the three phase windings of the normal set is increased to the increase upper limit current value at a maximum service temperature of the motor 51. The coercive force of the permanent magnet 12 can be improved by changing material, coating, and the like of the permanent magnet 12. The permeance of the operating point of the permanent magnet 12 can be set to a desired value by changing a peripheral width W of the permanent magnet 12, a thickness t of the permanent magnet 12, and an air gap L, which are shown in FIG. 5.

A cooling mechanism of the three phase windings is configured (designed) so that a temperature of the three phase windings of each set becomes less than or equal to a preliminarily set allowable temperature, when the supply current to the three phase windings of the normal set is increased to the increase upper limit current value at a maximum service temperature of the motor 51. For example, design of a heat sink for heat radiation and a heat transfer mechanism from the winding to the heat sink for heat radiation are changed. The allowable temperature may be increased by improving a heat resistance of the winding coat. In accordance with the increase upper limit current value, the cooling mechanism of the switching devices 61 and 62 of each set is designed.

Therefore, even at the time of abnormality occurrence of one set, by increasing the supply current to the three phase windings of the normal set, while ensuring the performance of the motor 51 close to the normal time, the base performance of the motor 51 can be prevented from deteriorating by the demagnetization of the permanent magnet 12 of the rotor 11, and the drive duration can be prevented from becoming short by heat generation of the winding of the motor 51. Accordingly, safety and reliability of the electric power steering apparatus 49 can be improved more.

Although the motor 51 of 10 poles 12 slots is explained in the present embodiment, combination of number of poles and number of slots is not limited to this.

Embodiment 2

The three phase duplexing motor 50 according to Embodiment 2 will be explained. The explanation for constituent parts the same as those in Embodiment 1 will be omitted. The basic configuration of the three phase duplexing motor 50 according to the present embodiment is the same as that of Embodiment 1; however, Embodiment 2 is different from Embodiment 1 in the winding method of the three phase windings 1 and 2.

Figure 13:
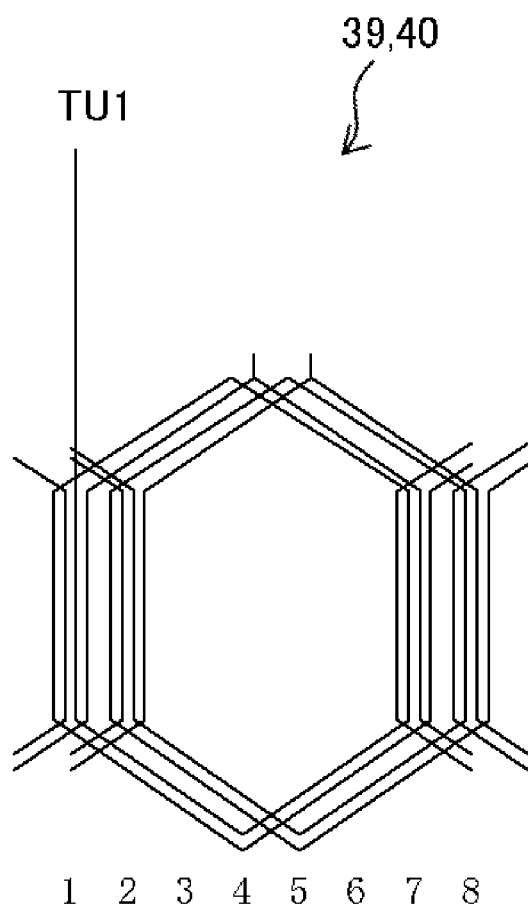
FIG. 13 is a winding arrangement and a connection diagram of six slot pitches of U phase of two sets of the three phase duplexing motor according to Embodiment 2.
Figure 15:
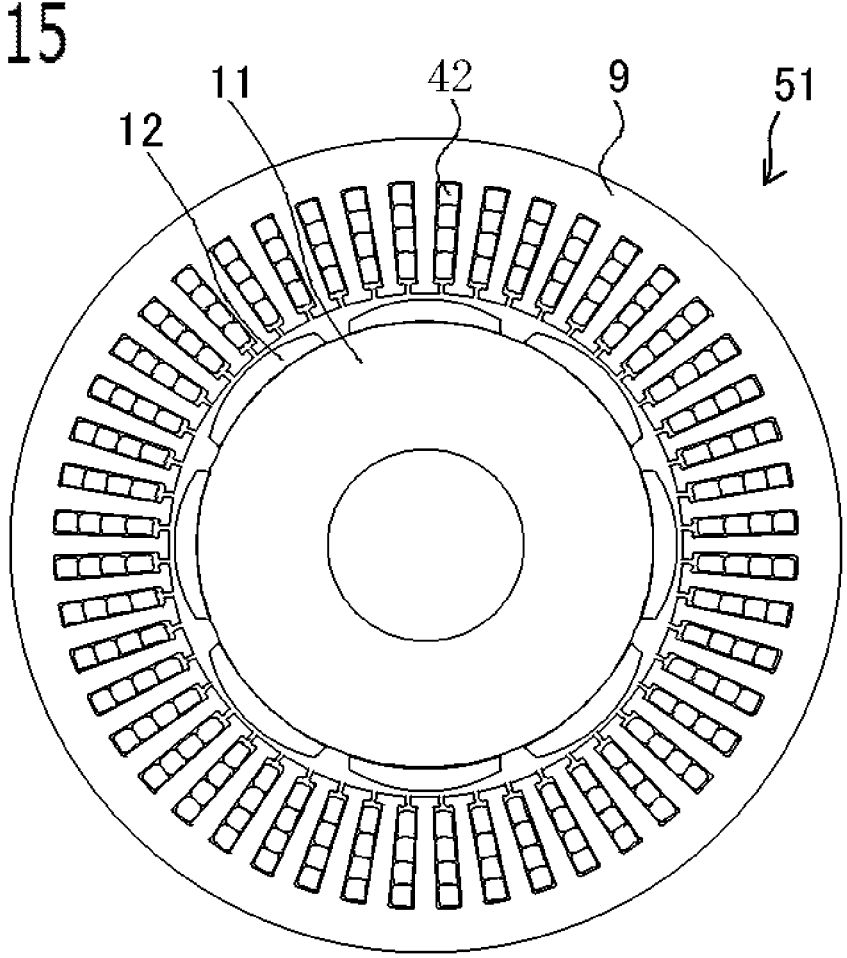
FIG. 15 is a cross-sectional view of a motor according to Embodiment 2.
Figure 16:
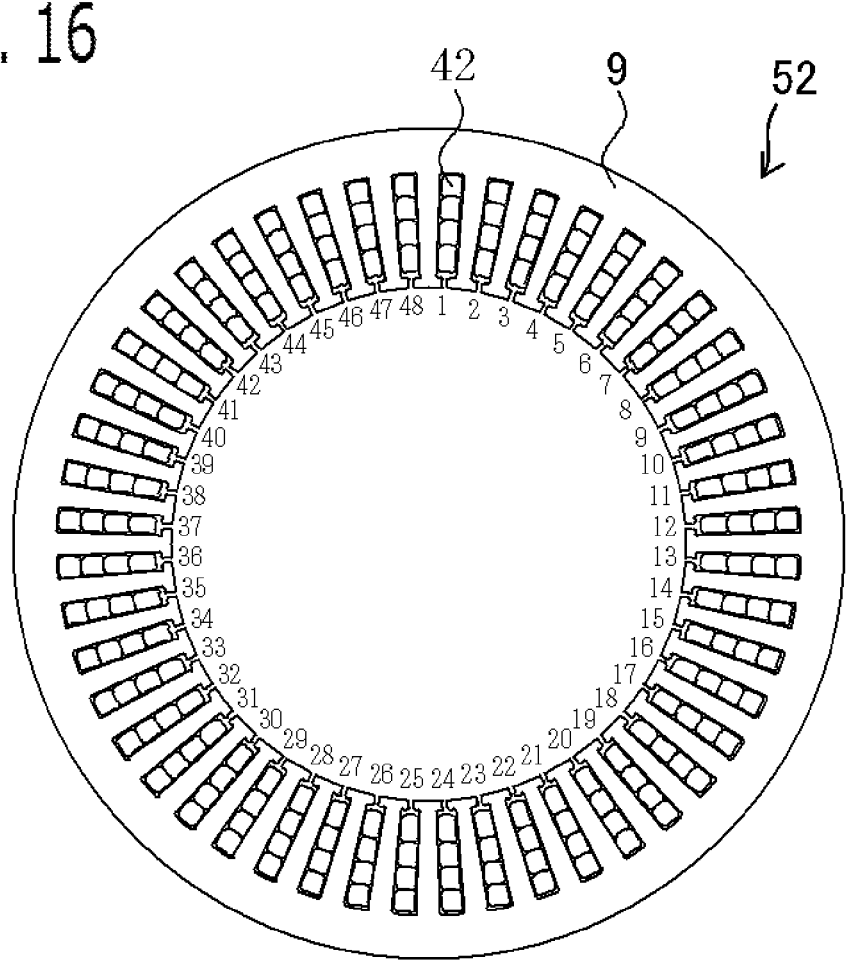
FIG. 16 is a cross-sectional view of a stator according to Embodiment 2.
Figure 17:
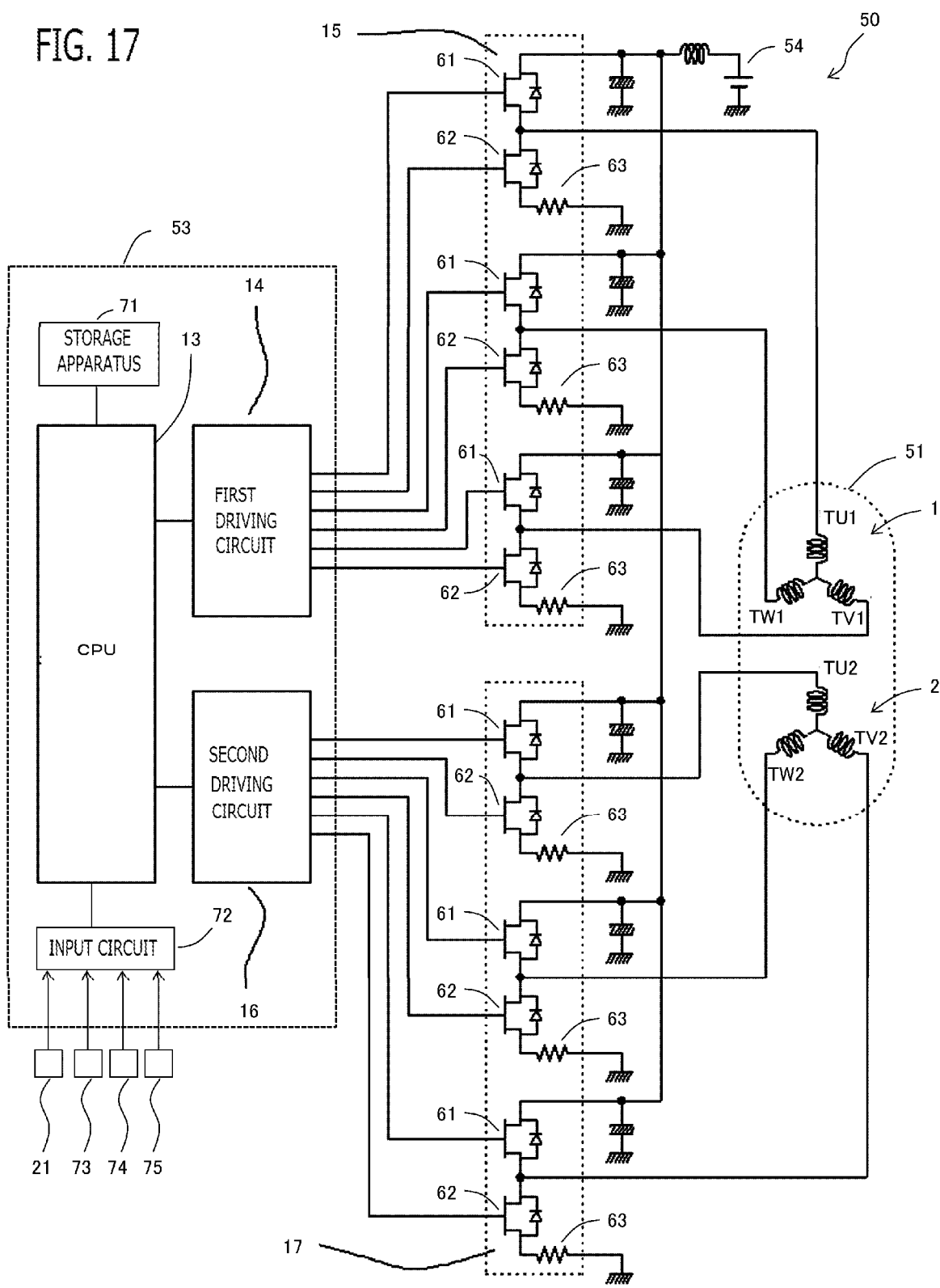
FIG. 17 is a schematic configuration diagram of a three phase duplexing motor according to Embodiment 2.

FIG. 9 is a winding arrangement and a connection diagram of the three phase duplexing motor 50 according to the present embodiment; FIG. 10 is a winding arrangement and a connection diagram of each set; FIG. 11 is a winding arrangement and a connection diagram of each set; FIG. 12 is a winding arrangement and a connection diagram U phase of each set; FIG. 13 is a winding arrangement and a connection diagram of the slot number 1 to 8 parts of U phase of each set; FIG. 14 is a winding arrangement and a connection diagram of the slot number 1 to 8 parts of U phase of each set; FIG. 15 is a cross-sectional view of the motor 51; FIG. 16 is a cross-sectional view of the stator 52; and FIG. 17 is a circuit diagram of the three phase duplexing motor 50.

As shown in FIG. 9 and FIG. 10, the first set and second set of the three phase windings 1 and 2 are distributed winding, and are by star connection, respectively. The first set of three phase windings 1 is provided with a neutral point 31 connecting the winding of each phase, and three phase connection terminals TU1, TV1, and TW1 connected to the first set of inverter 15. The second set of three phase windings 2 is provided with a neutral point 32 connecting the winding of each phase, and three phase connection terminals TU2, TV2, and TW2 connected to the second set of inverter 17. The number on the lower side of each of teeth 10 in FIG. 9 to FIG. 14 shows the slot number.

The motor 51 of the present embodiment is 8 poles 48 slots (refer to FIG. 15). One slot pitch corresponds to 30 degrees in the electrical angle. Each phase winding is wound straddling plural slots 42. About each phase, slots 42 which the first set of the three phase windings 1 is straddling, and slots 42 which the second set of the three phase windings 2 is straddling overlap with each other.

FIG. 11 and FIG. 12 are showing only first set of U phase winding 39, and second set of U phase winding 40. As shown in the Figures, the winding of each phase is wound by six slot pitches, that is, a 180 degrees pitch in the electrical angle, and is full pitch winding. That is, the winding of each phase is arranged at the predetermined slot 42, and then is arranged at the 6th slot 42 straddling five slots 42. FIG. 13 and FIG. 14 are showing only an unit winding for one pole of the permanent magnet 12 (slot number 1 to 8) about the first set of U phase winding 39 and the second set of U phase winding 40. As shown in Figure, the first set of U phase winding 39 and the second set of U phase winding 40 are shifted by one slot with each other. Accordingly, the first set of U phase winding 39 and the second set of U phase winding 40 are overlap with each other in five slots among 6 slot pitches.

As shown in FIG. 15, 48 slots 42 are provided in the stator core 9 formed by laminating the electromagnetic steal sheets. 2 sets of three phase windings 1 and 2 are placed at each slot 42 sandwiching the insulation material. The rotor 11 is provided inside the stator core 9. The eight permanent magnets 12 are provided at the outer peripheral part of the rotor 11. Only the stator 52 is shown in FIG. 16. The number described inside the stator core 9 indicates the slot number.

As shown in FIG. 17, as similar to Embodiment 1, connection terminals TU1, TV1, and TW1 of the first set of three phase windings 1 are connected to the first set of inverter 15. Connection terminals TU2, TV2, and TW2 of the second sets of three phase windings 2 are connected to the second sets of inverter 17. There is 30 degrees phase difference in the electrical angle between the supply current supplied to the first set of three phase windings 1, and the supply current supplied to the second set of three phase windings 2. Therefore, between the first set and the second set, it is possible to cancel and reduce the electrical angle 6th order torque ripple which is caused by the 5th and 7th order harmonic waves of the magnetomotive force of the permanent magnet 12, the 5th and 7th order harmonic waves of the magnetomotive force of the stator 52, and the 5th and 7th order harmonic waves of driving current.

The configuration of the first set and second set of inverters 15 and 17, and the controller 53 is the same as those in Embodiment 1 described above; therefore, the explanation will be omitted.

In the present embodiment, unlike Embodiment 1, as described above, the first set of three phase windings 1 and the second set of three phase windings 2 overlap with each other in five slots among 6 slot pitches. Accordingly, for example, even if the supply current to the second set of three phase windings 2 is set to 0, and the supply current to the first set of three phase windings 1 is increased from the normal time, total of the magnetomotive force of winding does not increase from the normal time in the part of overlapped five slots. Therefore, the magnetic field which acts on the permanent magnet 12 also becomes less than or equal to the normal time, and the demagnetization of the permanent magnet 12 can be prevented. Therefore, in the present embodiment, the problem of performance degradation by the demagnetization of the permanent magnet 12 of the rotor 11 hardly occurs.

Then, in the present embodiment, the increase upper limit current value is preliminarily set to the maximum value of the supply current range in which the temperature of the three phase windings of each set becomes less than or equal to a preliminarily set allowable temperature at the maximum service temperature of the motor 51. And, the cooling mechanism of the three phase windings is configured (designed) so that the temperature of the three phase windings of each set becomes less than or equal to the preliminarily set allowable temperature, when the supply current to the three phase windings of the normal set is increased to the increase upper limit current value at the maximum service temperature of the motor 51. For example, design of a heat sink for heat radiation and a heat transfer mechanism from the winding to the heat sink for heat radiation are changed. The allowable temperature may be increased by improving a heat resistance of the winding coat. In accordance with the increase upper limit current value, the cooling mechanism of the switching devices 61 and 62 of each set is designed. As a result, the increase upper limit current value is set to the rated current value of the three phase windings of each set.

Although the motor 51 of 8 poles 48 slots is explained in the present embodiment, combination of number of poles and number of slots is not limited to this.

Various modifications and alterations of this disclosure will be apparent to those skilled in the art without departing from the scope and spirit of this disclosure, and it should be understood that this is not limited to the illustrative embodiments set forth herein.

INDUSTRIAL APPLICABILITY

The present disclosure can be preferably used for a three phase duplexing motor for electric power steering apparatus.

REFERENCE SIGNS LIST

1 First Set of Three Phase Windings, 2 Second Set of Three Phase Windings, 10 Teeth, 11 Rotor, 12 Permanent Magnet, 13 Arithmetic Processor, 14 First Driving Circuit, 15 First Set of Inverter, 16 Second Driving Circuit, 17 Second Set of Inverter, 21 Torque Sensor, Slot, 49 Electric Power Steering Apparatus, 50 Three Phase Duplexing Motor, 51 Motor, 52 Stator, 53 Controller, 55a First motor current control unit, 55b Second motor current control unit, 56a First abnormality detection unit, 56b Second abnormality detection unit, 61 and 62 Switching device, 63 Shunt Resistance, 71 Storage Apparatus, 72 Input circuit

What is claimed is:

1. A three phase duplexing motor for an electric power steering apparatus comprising:
 a motor which is provided with a stator equipped with 2 sets of three phase windings, and a rotor equipped with a permanent magnet, and drives a steering mechanism of a vehicle;
 2 sets of inverters which supply AC power to each set of the three phase windings; and
 a controller which controls the 2 sets of inverters,
 wherein when abnormality occurs in a control system of the three phase windings of one set, the controller sets 0 to a supply current to the three phase windings of an abnormality occurrence set, and increases a supply current to the three phase windings of a normal set more than normal time, with a preliminarily set increase upper limit current value as an upper limit, and
 wherein the increase upper limit current value is preliminarily set to a maximum value of a supply current range in which a demagnetizing factor of the permanent magnet becomes less than or equal to a preliminarily set allowable demagnetizing factor.

2. The three phase duplexing motor for the electric power steering apparatus according to claim 1, wherein the increase upper limit current value is set to a rated current value of the three phase windings of each set.

3. The three phase duplexing motor for the electric power steering apparatus according to claim 1, wherein the preliminarily set allowable demagnetizing factor is a demagnetizing factor at a maximum service temperature of the motor.

4. The three phase duplexing motor for the electric power steering apparatus according to claim 1, wherein the increase upper limit current value is preliminarily set to a maximum value of a supply current range in which a temperature of the three phase windings of each set becomes less than or equal to a preliminarily set allowable temperature at a maximum service temperature of the motor.

5. The three phase duplexing motor for the electric power steering apparatus according to claim 1, wherein the increase upper limit current value is set on a basis of an ampere turn value obtained by multiplying a number of turns of winding to current.

6. The three phase duplexing motor for the electric power steering apparatus according to claim 1, wherein the permanent magnet is configured based on a condition in which the supply current to the three phase windings of the normal set was increased to the increase upper limit current value.

7. The three phase duplexing motor for the electric power steering apparatus according to claim 1, wherein a coercive force of the permanent magnet is configured so that a demagnetizing factor becomes less than or equal to a preliminarily set allowable demagnetizing factor, when the supply current to the three phase windings of the normal set is increased to the increase upper limit current value at a maximum service temperature of the motor.

8. The three phase duplexing motor for the electric power steering apparatus according to claim 1, wherein a permeance of an operating point of the permanent magnet is configured so that a demagnetizing factor becomes less than or equal to a preliminarily set allowable demagnetizing factor, when the supply current to the three phase windings of the normal set is increased to the increase upper limit current value at a maximum service temperature of the motor.

9. The three phase duplexing motor for the electric power steering apparatus according to claim 1, wherein a cooling mechanism of the three phase windings is configured so that a temperature of the three phase windings of each set becomes less than or equal to a preliminarily set allowable temperature, when the supply current to the three phase windings of the normal set is increased to the increase upper limit current value at a maximum service temperature of the motor.

10. The three phase duplexing motor for the electric power steering apparatus according to claim 1, wherein each set of the three phase windings is concentrated winding, and first set of the three phase windings and second set of the three phase windings are wound around different teeth of the stator with each other, and are not wound around the same teeth.

11. The three phase duplexing motor for the electric power steering apparatus according to claim 1, wherein each set of the three phase windings is distributed winding; each phase winding is wound straddling plural slots; and about each phase, slots which first set of the three phase windings is straddling, and slots which second set of the three phase windings is straddling overlap with each other.

* * * * *